United States Patent
Rai et al.

(10) Patent No.: US 8,433,604 B2
(45) Date of Patent: Apr. 30, 2013

(54) SYSTEM FOR SELECTING AN OPTIMAL SAMPLE SET OF JOBS FOR DETERMINING PRICE MODELS FOR A PRINT MARKET PORT

(75) Inventors: Sudhendu Rai, Fairport, NY (US); Amarnath Purohit, Rochester, NY (US); James Quackenbush, Vernon, NJ (US); Shi Zhao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 472 days.

(21) Appl. No.: 12/718,170

(22) Filed: Mar. 5, 2010

(65) Prior Publication Data

US 2011/0218938 A1 Sep. 8, 2011

(51) Int. Cl.
*G06F 17/10* (2006.01)
*G06Q 99/00* (2006.01)

(52) U.S. Cl.
USPC .................. 705/7.38; 705/7.31; 705/400

(58) Field of Classification Search .............. 705/7.31, 705/400, 7.38
See application file for complete search history.

(56) References Cited

U.S. PATENT DOCUMENTS

| | | | | |
|---|---|---|---|---|
| 7,072,863 | B1 * | 7/2006 | Phillips et al. | 705/36 R |
| 7,584,116 | B2 * | 9/2009 | Kakouros et al. | 705/7.31 |
| 8,015,055 | B2 * | 9/2011 | Makita et al. | 705/7.38 |
| 2002/0152183 | A1 * | 10/2002 | Soares et al. | 705/400 |
| 2007/0293959 | A1 * | 12/2007 | Takezawa et al. | 700/44 |
| 2011/0043846 | A1 | 2/2011 | Sprague et al. | |

OTHER PUBLICATIONS

C. Englunda, A. Verikasa,b; "A SOM-based data mining strategy for adaptive modelling of an offset lithographic printing process", (2007) 391-400 Engineering Applications of Artificial Intelligence 20; pp. 391-400.*
C. Englunda, A. Verikas; "A SOM -based data mining strategy for adaptive modelling of an offset lithographic printing process", (2007) 391-400 Engineering Applications of Artificial Intelligence 20; pp. 391-400.*

* cited by examiner

*Primary Examiner* — John W Hayes
*Assistant Examiner* — Freda A Nelson
(74) *Attorney, Agent, or Firm* — Faye Sharpe LLP

(57) ABSTRACT

A system for determining price models of a print market port including a processor and a computer-readable storage medium in communication with the processor, wherein the computer-readable storage medium comprises one or more programming instructions for: partitioning a job dataset into a plurality of categories, each of the plurality of categories having a pricing model; determining one or more factors within the job dataset that influence a price of each job; developing an input/output model for each job in the job dataset that influences the price of the job; performing an iteration to compute a prediction error for each job in the job dataset that influences the price of the job; removing one or more jobs from a subsequent iteration that include prediction errors that exceed a prediction error threshold; and performing a plurality of iterations on remaining jobs until a predetermined average error prediction is reached.

20 Claims, 5 Drawing Sheets

SYSTEM FOR SELECTING AN OPTIMAL SAMPLE SET OF JOBS FOR DETERMINING PRICE MODELS FOR A PRINT MARKET PORT

BACKGROUND

1. Field of Related Art

The present disclosure is generally related to print job processing, and more particularly, to a system for automatically selecting an optimal sample set of jobs for determining price models for a print market port.

2. Description of Related Art

Reverse auctions are commonly used to minimize the purchase price of items. In this style of auction the role of the buyer and the seller are reversed such that the seller engages in competitive bidding in which items are offered for sale at a bid price of the seller's choosing. The buyer may select among the bids. Some reverse auction rules require the buyer to select the lowest bid. By engaging in a reverse auction, also referred to as a procurement auction, a buyer may sometimes purchase items at a lower price than is available through more typically used commercial channels. These reverse auctions may place downward pricing pressure on the sellers facilitating them to cut costs, increase efficiency and/or minimize waste. These auctions are sometimes used to facilitate business-to-business transactions.

Some reverse auctions are organized by a broker (sometimes referred to as a market maker) using a marketplace. The buyers and/or sellers contract with the broker to agree to be bound to the marketplace rules and procedures. The broker also provides consulting services and other market facilitating tasks. Additionally, advertising campaigns generally use a variety of advertising techniques regarding the marketplace. Purchasing for services utilizing these techniques may be obtained in a variety of ways, including via outsourcing. Nevertheless, one or more jobs need to be selected in an optimal manner in order for the reverse auction to be effective. Currently, the manual selection of jobs may be a cumbersome, inaccurate, and expensive process.

SUMMARY

A system is presented for determining price models of a print market port, including a processor and a computer-readable storage medium in communication with said processor, wherein the computer-readable storage medium comprises one or more programming instructions for: partitioning a job dataset into a plurality of categories, each of the plurality of categories having a pricing model; determining one or more factors within the job dataset that influence a price of each job in the job dataset; developing an input/output model for each job in the job dataset that influences the price of the job; performing an iteration to compute a prediction error for each job in the job dataset that influences the price of the job; removing one or more jobs from a subsequent iteration that include prediction errors that exceed a prediction error threshold; and performing a plurality of iterations on remaining jobs until a predetermined average error prediction is reached.

Another system is presented for selecting an optimal set of jobs, including a processor and a computer-readable storage medium in communication with said processor, wherein the computer-readable storage medium comprises one or more programming instructions for: collecting historical job data related to a plurality of jobs; analyzing the historical job data based upon one or more criteria; constructing a neural network model for each of the plurality of jobs; predicting a cost of each of the plurality of jobs; comparing the cost predicted for each of the plurality of jobs to an actual cost for each of the plurality of jobs; and iteratively removing one or more jobs of the plurality of jobs having a cost prediction error greater than a predetermined cost prediction error until the optimal set of jobs is reached.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
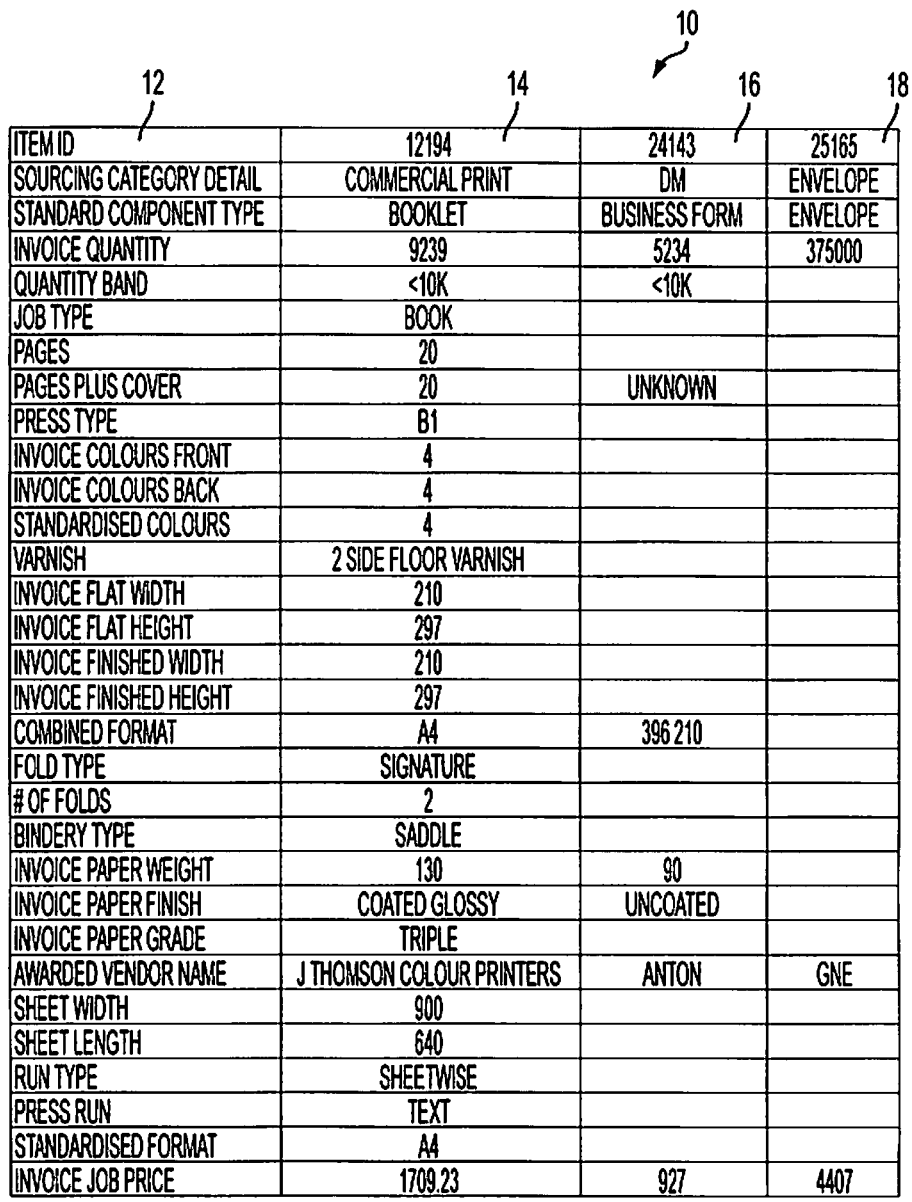
FIG. 1 shows a chart illustrating three jobs and their corresponding attributes, in accordance with the present disclosure.

Particular embodiments of the present disclosure are described herein below with reference to the accompanying drawings. In the following description, well-known functions or constructions are not described in detail to avoid obscuring the present disclosure in unnecessary detail.

The exemplary embodiments of the present disclosure propose an automated method for selecting an optimal sample set of jobs for determining price models for a print market port. Historical job data may be analyzed based upon a number of different criteria. A neural network may be constructed for predicting the cost of each job. The predicted cost may be compared to the actual cost. The method then iteratively removes one or more jobs from an analysis list whose error in cost prediction is too high. The jobs fitting the job prediction error threshold may then be re-analyzed (i.e., after the removal of certain jobs). After a fixed set of iterations is performed, or until an average prediction error rate is reached (e.g., 2% or 10%), an optimal job basket is determined which is subsequently used to establish baseline prices. This proposed methodology may replace current manual processes of choosing the "job basket." Thus, the exemplary embodiments of the present disclosure propose a statistical approach by using neural network price models for "job basket" generation within a print port market.

The exemplary embodiments of the present disclosure further propose a statistical approach to determining an optimal "job basket." Historical job data may be partitioned into multiple subsets. A neural network model may then be constructed to predict the price of jobs as a function of job attributes. In many cases, jobs exist within the dataset for which a complete set of factors that drive the price are not available. The neural network model may not properly predict all the jobs. Jobs whose predictive error is higher than a threshold percentage may be dropped in the next iteration. Thus, another neural network model may be built with a smaller set of jobs. The prediction error model may be used to filter out jobs until a set of jobs is determined whose price may be accurately modeled. These jobs are then used as the "job basket." Additionally, some jobs may be manually added to the set of jobs to determine the final "job basket." As a result, the neural network model may be used as a predictor of price for future jobs.

In particular, the system of the present disclosure may be a system including a marketplace, such as a print marketplace, organized and facilitated by a broker. The marketplace may be implemented by utilizing a personal computer, a server-based computer, a processor, hardware, software, software in execution, in virtualization, one or more servers, firmware, microcode, by an operative set of processor executable instructions configured by execution by at least one processor, the like, or some combination thereof.

The broker may provide the marketplace and facilitate transactions. The transactions may be facilitated by the broker by providing legal services, the contractual framework, and the market rules and procedures. The broker may also provide one or more of the following services: (1) consulting services, (2) facilitate the market, (3) provide market facilitation technologies, (4) provide pricing models, (5) optimize prices, (6) provide the legal framework so that prices may be temporarily fixed during the bidding process, (7) provide vendor process optimization services, (8) facilitate the achievement of environmental goals by one or more parties, and/or (9) optimize the workflow.

Some of the jobs required for these goods and services are available for procurement via the marketplace by procuring one of the plurality of vendors. Some of the services offered by the vendors may include job types chosen from: direct mail campaign catalogs, direct mail campaign advertising, and direct mail non-printable services, which may be provided to the buyer along with direct mail campaign services.

For example, advertising services and nonprintable services may be deliverable through the marketplace. An advertising campaign may have several job types, some of which may be related to unique jobs that facilitate the conduction of an effective advertising campaign. For instance, advertising campaigns may include several non-printable jobs such as legal and translation services, format conversions, and security services, each one depending upon other jobs to perform those functions providing a multi-varied advertising campaign production environment. When the buyer generates a campaign-specifications data structure, including several job specifications, (e.g., job specifications), the options are presented to the buyer based upon the entered configurations and preferences entered into the marketplace.

Moreover, job specifications of the campaign specification data structure may be a job type selected from a direct mail campaign catalog, a direct mail campaign advertising, and/or direct mail non-printable services. The selectable job types selectable from each of these will now be discussed. The direct mail campaign catalog may include a catalog, card jobs, envelope jobs, brochure jobs, poster jobs, and printing package jobs. Direct mail campaign advertising may include mail preparation, shipping services, direct mail targeting services, market research, newspaper insert services, campaign results services, and newspaper insert services for job type selection. Advertising may utilize mail preparation services and other delivery services to ship advertising materials including post cards, letters, brochures, catalogs, and flyers.

Furthermore, advertising jobs may consist of the following services: market research, newspaper inserts, evaluation of campaign results services, and the like. A market research component may correspond to the following services: media market research services (which define the advertising channels) and geographic scope services (which define the scope of the campaign (e.g., international, regional, local), and the like. A campaign evaluation service may be used to measure the results of carrying out the campaign (such as pre-campaign measurement and post-campaign measurement of the customer awareness). Overall, this process allows buyers to include campaign advertising as part of the direct mail campaign in the total print volume they procure for their clients and thereby achieve greater savings. Direct mail non-printable services may also include several job types giving the buyer the ability to add non-printable services including legal services, notary services, translation services, file conversion services, security services, and the like.

Referring to FIG. 1, a chart illustrating three jobs and their corresponding attributes, in accordance with the present disclosure is presented.

The chart 10 includes an item ID column 12, a first job column 14, a second job column 16, and a third column job 18. The item ID column 12 may include at least sourcing category detail, standard component type, invoice quantity, quantity band, job type, pages, page plus cover, etc. It is contemplated that one skilled in the art may include a plurality of different factors and/or variables related to a print market port.

During the setup of the print market port product, historical job data may be collected from an enterprise. The historical procurement price and the attributes of the jobs may then be determined. From this collected set of jobs, the goal may be to determine a smaller set referred to as the "job basket" that represents the sample of print jobs procured by the enterprise whose price may be accurately predicted. A statistical approach to create the "job basket" will be described below with reference to FIG. 2.

Figure 2:
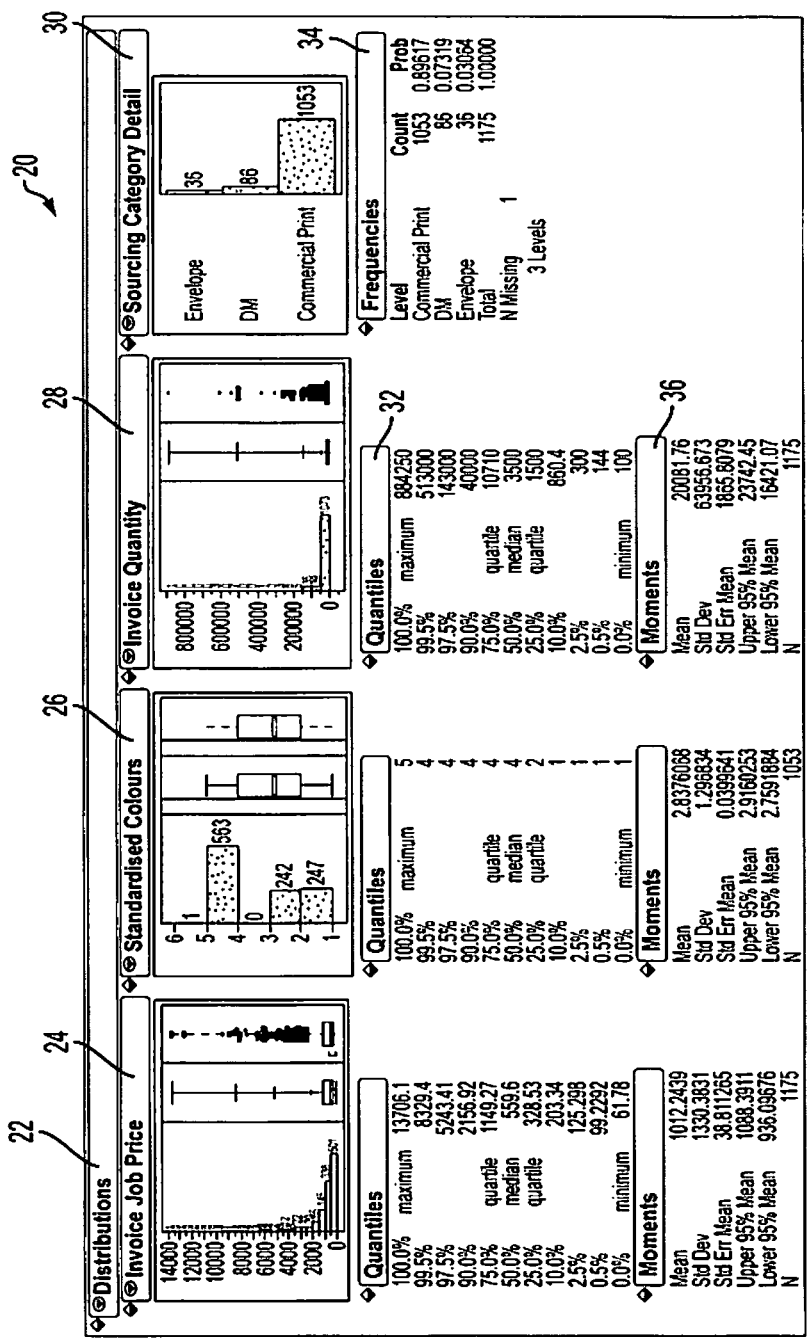
FIG. 2 shows a chart illustrating segmentation of different distributions associated with the various jobs, in accordance with the present disclosure.

Referring to FIG. 2, a chart illustrating segmentation of different distributions associated with the various jobs, in accordance with the present disclosure is presented.

The chart 20 includes distributions 22 associated with different parameters/attributes that describe each job. The attributes may include an invoice job price 24, standardized color 26, invoice quantity 28, and sourcing catalog detail 30. Additionally, other attributes may include quantities 32, frequencies 34, and moments 36.

Since different categories of print have different price models, the first step in the process may be to partition the dataset into subsets of different categories of services. These categories may include prep-press, pre-press and print, book, envelope, open item, commercial print, and/or direct mail.

For the dataset under consideration, an analyst may decide to create different pricing models for each of the three categories or print procurement. That is, for commercial print, direct marketing, and envelopes. The exemplary embodiment described in FIG. 2 illustrates how to create a "job basket" for one set of data, namely, commercial print jobs. For instance, there may be a total of over 1000 commercial print jobs in this category (e.g., 1053). Since the print procurement data is rarely complete (i.e., not all the factors that drive the price of the job are available for every job), trying to use all of the data to create a price model may lead to inaccurate models and large prediction errors. Thus, an iterative approach/algorithm may be used to determine a set of optimal jobs (e.g., referred to as a "job basket") whose price may be accurately modeled.

In a further step, the factors within the dataset that influence the price are determined. The job data may have attributes that do not directly influence the price. These attributes may be filtered out leaving behind only those attributes that have some impact on the price. These parameters may be denoted as, x. The price of the jobs is then given by, p(x). The determination of the factors that drive the price is left to the analyst. For instance, the analyst, by using his/her knowledge of the print domain, may decide that, for example, 28 factors/attributes (see FIG. 3) influence the price of the job. Thus, the job price is equal to f(attributes).

Figure 3:
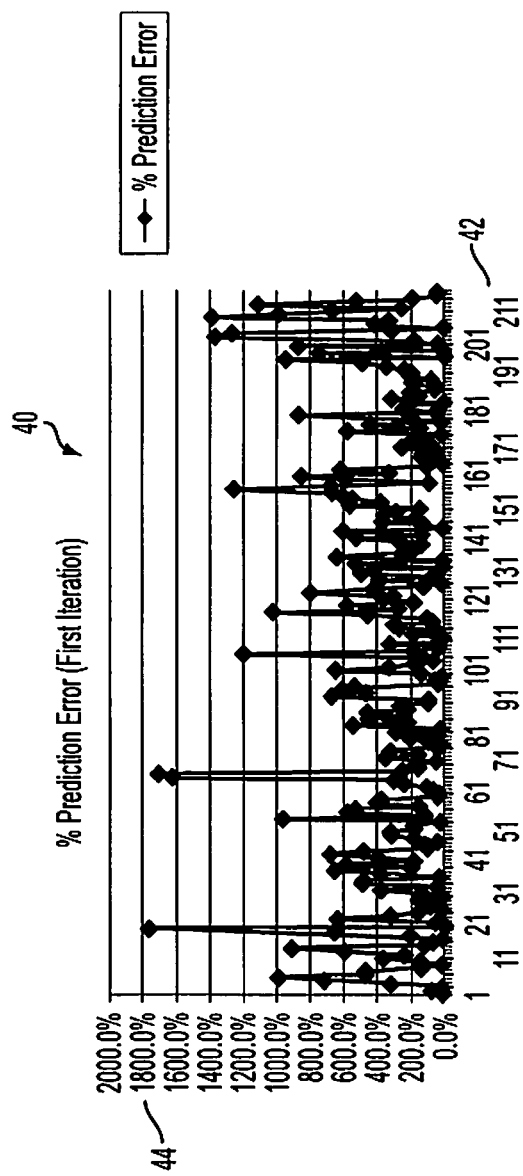
FIG. 3 shows a graph illustrating price prediction errors for job prices after a first iteration is completed, in accordance with the present disclosure.

Referring to FIG. 3, a graph illustrating price prediction errors for job prices after a first iteration is completed, in accordance with the present disclosure is presented.

The graph 40 includes the number of attributes 42 on the x-axis and the absolute error percentage 44 on the y-axis. Graph 40 is composed by developing an input/output model of the price of each job of a job dataset. The neural network model may predict a price for each job. By using the actual price and the predicted price, the absolute error and the absolute percentage error for each job may be determined. For example, for the 1053 data points, the prediction error is shown in FIG. 3. The average prediction error across all jobs is 105%.

The comparison between the predicted price and the actual price may determine the lowest price from the plurality of prices associated with the authorized set of entries and/or the lowest of the green weighted price values (e.g., if price and environmental concerns are both taken into account). The lowest price and/or the lowest green weighted price value may be flagged in calculating such components and/or may be communicated to the buyer.

Figure 4:
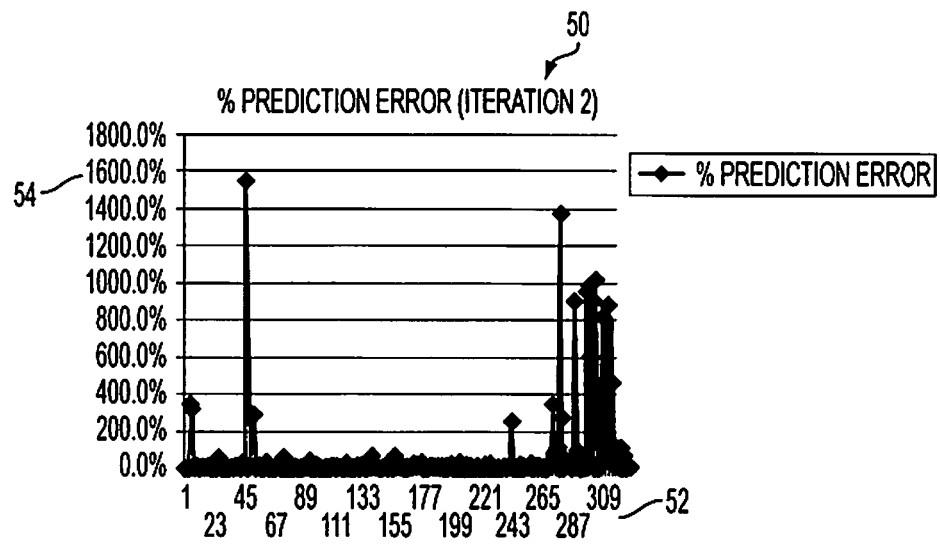
FIG. 4 shows a graph illustrating price prediction errors after a second iteration is completed by using a fixed threshold, in accordance with the present disclosure.

Referring to FIG. 4, a graph illustrating price prediction errors after a second iteration is completed by using a fixed threshold, in accordance with the present disclosure is presented.

The graph 50 includes the number of attributes 52 on the x-axis and the absolute error percentage 54 on the y-axis. Graph 50 is composed by developing an input/output model of the price of each job of a job dataset.

In a next step, the jobs from the next modeling iteration are eliminated because they have prediction errors that are higher than a threshold prediction error. The premise is that jobs that produce a large modeling error are not good candidates for developing a pricing model. The most likely cause is that the data available is not sufficient to determine the price of the jobs. However, there are a couple of ways to determine the threshold. One way is to make the threshold a constant, say 2% or 10%. After the first round of elimination, in the exemplary embodiment shown in FIG. 3, one is left with 331 jobs. The neural network model is performed once more and the error prediction is shown in FIG. 4. The average prediction error for this subset is 52%.

Figure 5:
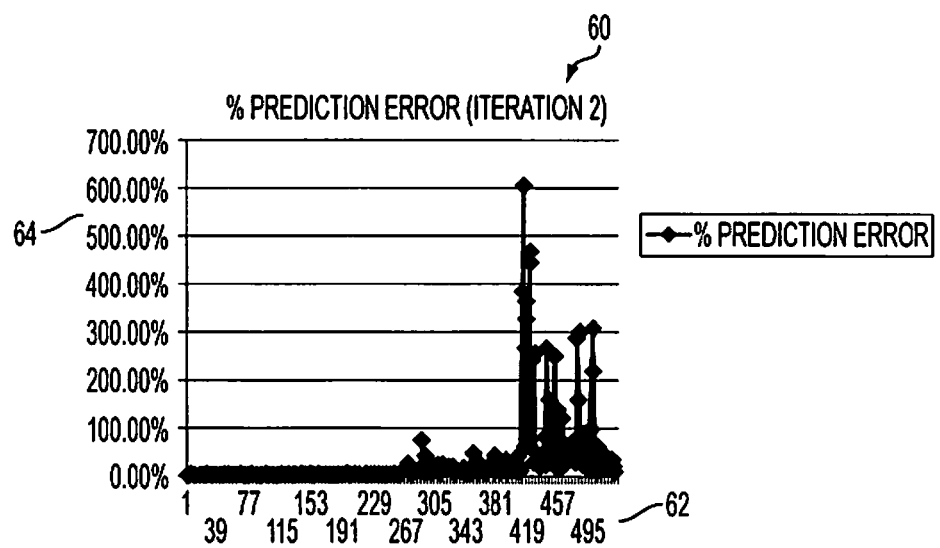
FIG. 5 shows a graph illustrating price prediction errors after a second iteration is completed by using a median as a threshold, in accordance with the present disclosure.

Referring to FIG. 5, a graph illustrating price prediction errors after a second iteration is completed by using a median as a threshold, in accordance with the present disclosure is presented.

The graph 60 includes the number of attributes 62 on the x-axis and the absolute error percentage 64 on the y-axis. Graph 60 is composed by developing an input/output model of the price.

Another way to determine the threshold may be referred to as the distribution of the prediction errors (e.g., Gaussian distribution model/calculation). It is proposed to use the median as the threshold. However, one skilled in the art may contemplate using any desirable statistical calculation. For example, the median of the prediction error in the first iteration is 20%. After elimination of certain jobs, there are 526 jobs left, which is about half the jobs that were initially analyzed.

Additionally, in FIG. 5, the average prediction error is about 22% lower than using the fixed threshold, as described in FIG. 4. Another advantage of using a median as a threshold is that is guarantees reduction in prediction errors or convergence to smaller prediction errors.

Figure 6A:
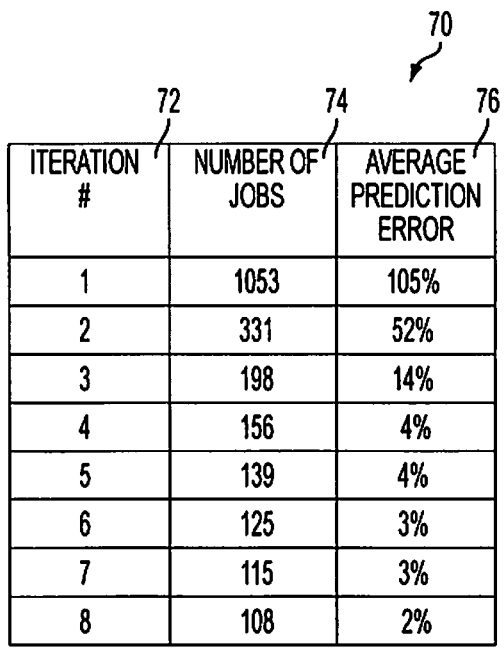
FIGS. 6A and 6B show charts illustrating results of iteration resulting in a lowered average percentage prediction by using a fixed threshold and a median as a threshold, respectively, in accordance with the present disclosure.
Figure 6B:
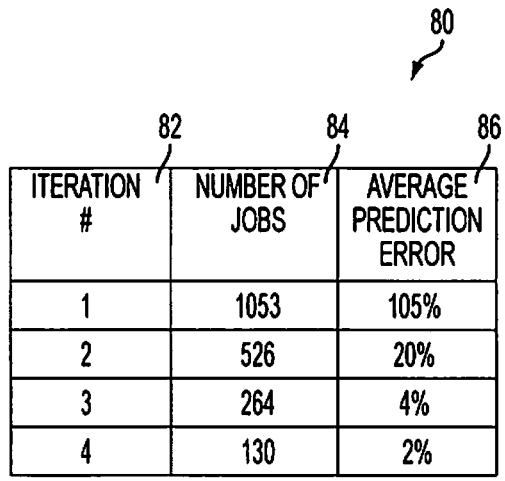

Referring to FIGS. 6A and 6B, charts illustrating results of iteration resulting in a lowered average percentage prediction by using a fixed threshold and a median as a threshold, in accordance with the present disclosure are presented.

The chart 70 of FIG. 6A includes three columns, a number of iterations column 72, a number of jobs column 74, and an average prediction error column 76. The chart 80 of FIG. 6B includes three columns, a number of iterations column 82, a number of jobs column 84, and an average prediction error column 86.

FIG. 6A illustrates results of iteration resulting in a lowered average percentage prediction error by using a fixed threshold of, for example, 10%. The result of this iteration is a job set of 108 jobs whose price modeling error is low. FIG. 6B illustrates results of iteration resulting in a lowered average percentage prediction error by using a median threshold. The result of this iteration is a job set of 130 jobs whose price modeling error is low. Once again, compared to using the fixed threshold, one advantage of using the median is that it requires less number of iterations and the convergence rate is higher. This is representative of a "job basket" for the commercial print category of jobs. Additionally, it is noted that the algorithm described above with respect to the exemplary embodiments may be fully automated so that the input is a job dataset, a set of factors that drive price, and the output is a "job basket." The automated algorithm may lead to solutions for creating a "job basket" within minutes, instead of days. This result has the potential of significantly improving the phase of setting up a print market port at a customer account.

In summary, the supplier (e.g., a vendor) may be analyzed for the "price" factors. The following factors described below may be taken into account for each price impact assessment and may be utilized to determine if a vendor has satisfied a predetermined certification status or may be submitted as a vendor preference.

For a pre-press type, the following factors may be considered: non-hazardous chemicals and finishers for plate making, fully digital prepress (eliminating the photochemical process), electronic imaging, and use of pre-sensitized plates that are processed with water rather than chemicals. For a press type, the following factors may be considered: use of waterless offset printing, minimization of color changes, run similar jobs back to back to reduce waste generation, dedicated presses for specific inks or ink combinations, use of web detectors and automatic splicers, use of cooling to reduce evaporation, and alcohol-free printing. For paper type, one or more of the following may be used: use of FSC or similarly certified paper for printing and use of recycled papers. For ink type, one or more of the following may be used: use of non petroleum-based inks, use of inks without heavy metals, and use of automatic inks levelers to keep optimal levels. For post press, one or more of the following may be used: use of water based or hot glue adhesives rather than solvent based adhesives, use of mechanical binding method instead of glue, bindery waste reduction efforts, and bindery waste recycling efforts.

Other factors that may also be considered may be: recycling of supply and product containers (i.e., drums, plastic bottles, etc), facility-wide program for recycling (i.e. toner and ink cartridges, aluminum cans, office paper waste, etc), use of recycled and/or biodegradable wrapping supplies, shipping cartons, pallets, etc., use of the renewable energy sources (e.g., wind power, solar power, thermal power), recovery of solvents with on-site distillation equipment, and using "lean processes" that reduce waste.

A graphical user interface (GUI) that a vendor may view when providing price quotes for one or more jobs may show a screen for submitting data e.g., information relating to the factors as previously described. The information inputted may be stored in the marketplace, such as in a marketplace database. The information transmitted utilizing the GUI interface may relate to a particular vendor of a plurality of vendors and may be used to calculate a price impact assessment, a price offset related to an environmental impact, the suitability of being certified by a predetermined certification having a predetermined set of criteria, to calculate a green factor, and/or may be utilized within an Environmentally Responsible Product Assessment Matrix (ERPA).

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for determining price models of a print market port, the system comprising:
   processor; and
   a computer-readable storage medium in communication with said processor, wherein the computer-readable storage medium comprises one or more programming instructions for:
   partitioning a job dataset into a plurality of categories, each of the plurality of categories having a pricing model;
   determining one or more factors within the job dataset that influence a price of each job in the job dataset;
   developing an input/output model for each job in the job dataset that influences the price of the job;
   performing an iteration to compute a prediction error for each job in the job dataset that influences the price of the job;
   removing one or more jobs from a subsequent iteration that include prediction errors that exceed a prediction error threshold;
   performing a plurality of iterations on remaining jobs until a predetermined average error prediction is reached;
   determining an optimal job dataset including a sample set of jobs remaining after the plurality of iterations; and,
   determining the pricing model using the optimal job dataset.

2. The system according to claim 1, wherein the job dataset includes historical job data.

3. The system according to claim 1, wherein the input/output model is developed by utilizing a neural network model.

4. The system according to claim 1, wherein the price of the job is determined as a function of job attributes that influence the price of the job.

5. The system according to claim 1, wherein the plurality of categories include pre-press, pre-press and print, book, envelope, open item, commercial print, and direct mail.

6. The system according to claim 1, wherein the prediction error is computed by comparing an actual price of each job to a predicted price of each job to determine an absolute error and an absolute percentage error for each job.

7. The system according to claim 1, wherein the predetermined average error prediction is a constant.

8. The system according to claim 7, wherein the constant is 2%.

9. The system according to claim 1, wherein the predetermined average error prediction is based on a median number derived from a Gaussian distribution calculation.

10. The system according to claim 1, wherein select jobs of the job dataset are manually entered into the system.

11. A system for selecting an optimal set of jobs, the system comprising:
    a processor; and
    a computer-readable storage medium in communication with said processor, wherein the computer-readable storage medium comprises one or more programming instructions for:
    collecting historical job data related to a plurality of jobs;
    analyzing the historical job data based upon one or more criteria;
    constructing a neural network model for each of the plurality of jobs;
    predicting a cost of each of the plurality of jobs;
    computing a cost prediction error by comparing the cost predicted for each of the plurality of jobs to an actual cost for each of the plurality of jobs; and
    iteratively removing one or more jobs of the plurality of jobs having the cost prediction error greater than a predetermined cost prediction error until a predetermined average error prediction is reached; and
    determining a pricing model using an optimal set of jobs remaining after the predetermined average error prediction is reached.

12. The system according to claim 11, wherein the cost of each of the plurality of jobs is determined as a function of job attributes that influence the price of each job of the plurality of jobs.

13. The system according to claim 11, wherein the historical job data is partitioned into plurality of categories that each include pre-press, pre-press and print, book, envelope, open item, commercial print, and direct mail.

14. The system according to claim 11, wherein the comparing step determines an absolute error and an absolute percentage error for each job of the plurality of jobs.

15. The system according to claim 11, wherein the predetermined cost prediction error is a constant.

16. The system according to claim 15, wherein the constant is 2%.

17. The system according to claim 11, wherein the predetermined cost prediction error is based on a median number derived from a Gaussian distribution calculation.

18. The system according to claim 11, wherein select jobs of the plurality of jobs are manually entered into the system.

19. The system according to claim 11, wherein the system further determines price models for a print market port.

20. The system according to claim 11, wherein the system is automated.

* * * * *